(12) United States Patent
Keehr et al.

(10) Patent No.: US 8,150,356 B2
(45) Date of Patent: Apr. 3, 2012

(54) SPLIT ANALOG/DIGITAL POLYNOMIAL NONLINEAR TERM GENERATOR WITH REDUCED NUMBER OF ANALOG-TO-DIGITAL CONVERTERS

(75) Inventors: Edward Keehr, Pasadena, CA (US); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 261 days.

(21) Appl. No.: 12/687,113

(22) Filed: Jan. 13, 2010

(65) Prior Publication Data
US 2010/0176981 A1 Jul. 15, 2010

Related U.S. Application Data

(60) Provisional application No. 61/205,009, filed on Jan. 14, 2009.

(51) Int. Cl.
*H04B 1/10* (2006.01)
(52) U.S. Cl. .......................... 455/295; 455/296; 455/302
(58) Field of Classification Search ................. 455/284, 455/285, 295, 313, 323, 296, 114.3, 63.1, 455/67.13, 302; 375/278, 285, 296
See application file for complete search history.

(56) References Cited

U.S. PATENT DOCUMENTS

| | | | |
|---|---|---|---|
| 5,909,642 A * | 6/1999 | Suzuki | 455/114.3 |
| 6,704,559 B1 * | 3/2004 | Hageraats | 455/326 |
| 7,774,176 B2 * | 8/2010 | Rao et al. | 703/2 |
| 7,894,788 B2 * | 2/2011 | Keehr et al. | 455/296 |
| 8,063,701 B2 * | 11/2011 | Amrutur et al. | 330/149 |

* cited by examiner

*Primary Examiner* — Sonny Trinh
(74) *Attorney, Agent, or Firm* — Milstein Zhang & Wu LLC; Joseph B Milstein

(57) ABSTRACT

A polynomial nonlinear term generator is configured to receive an RF signal. An analog cubic term generator generates an analog cubic term signal and an analog square term generator generates an analog square term signal, both derived from the RF signal. A cubic term mixer assembly mixes a local oscillator (LO) signal with the cubic term signal to generate a synthetic IM3 signal. A square term ADC provides a digital square term signal and a cubic term ADC provides a digital cubic term signal. At least one digital multiplier has a first multiplier input terminal configured to receive a selected one of the digital square term signal and the digital cubic term signal, and a second multiplier input terminal configured to receive the digital square term signal. The multiplier provides as output a digital IMn product where n is greater than 3. A corresponding method is also described.

33 Claims, 16 Drawing Sheets

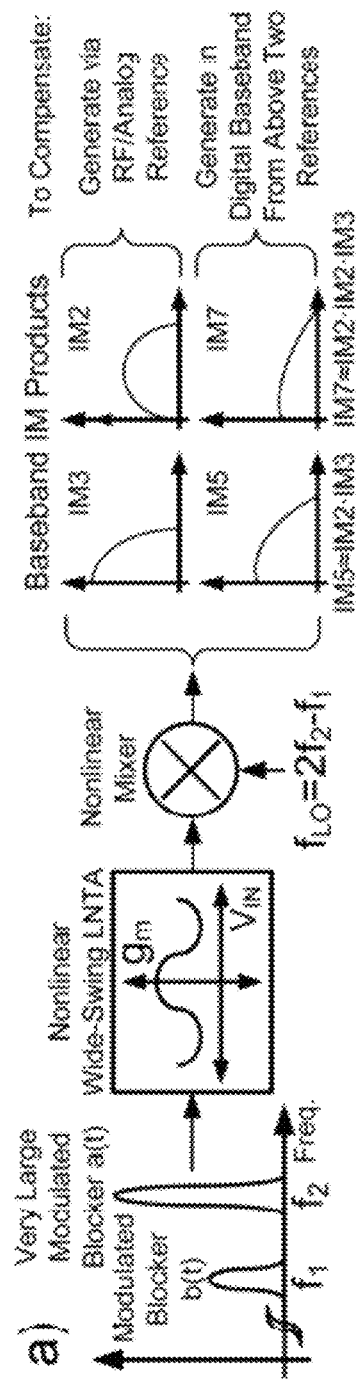
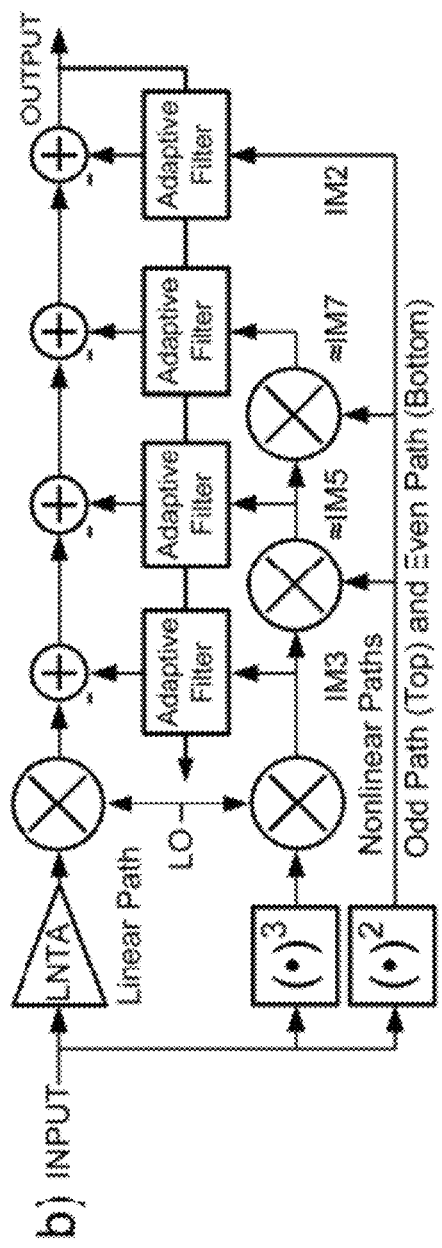
FIG. 6A
FIG. 6B

*LNTA Input Inductor Tuned By Parasitic Capacitances At Nonlinear Path Inputs

SPLIT ANALOG/DIGITAL POLYNOMIAL NONLINEAR TERM GENERATOR WITH REDUCED NUMBER OF ANALOG-TO-DIGITAL CONVERTERS

CROSS-REFERENCE TO RELATED APPLICATIONS

This application claims priority to and the benefit of U.S. provisional patent application Ser. No. 61/205,009 filed Jan. 14, 2009, priority to and the benefit of U.S. provisional patent application Ser. No. 61/181,237 filed May 26, 2009, priority to and the benefit of U.S. provisional patent application Ser. No. 61/181,243 filed May 26, 2009, and priority to and the benefit of U.S. provisional patent application Ser. No. 61/181,247 filed May 26, 2009, each of which applications are incorporated herein by reference in their entirety. This application is also related to U.S. patent application Ser. No. 12/233,314, Equalization of Third-Order Intermodulation Products in Wideband Direct Conversion Receiver, filed Sep. 18, 2008.

FIELD OF THE INVENTION

The invention relates to a nonlinear term generator in general and particularly to a polynomial nonlinear term generator that employs a split analog/digital architecture.

BACKGROUND OF THE INVENTION

Throughout the history of radio, receivers and their component blocks have been considered to exist within the realm of small-signal circuit design. Metrics such as ICP1 (compression point) were meant to denote regions of operation to be avoided and typically limited the maximum signal handling of the receiver input at nearly any frequency offset to far less than 1V. Although receiver linearity has been the subject of much study, the typical design procedure has been to constrain the system to consist of intentionally linear circuit blocks, hence only requiring the consideration of 2nd and 3rd order nonlinear terms as nonidealities at or near the receiver noise floor.

What is needed, therefore, is a radio that can handle the presence of higher-order intermodulation (IM) products beyond IM3.

SUMMARY OF THE INVENTION

As used herein, the notation IMn is to be understood to mean an intermodulation product or signal component of order n, where n is an integer greater than or equal to 1.

In one aspect, the invention relates to a polynomial nonlinear term generator that includes an input RF terminal that is configured to receive an RF signal. An analog cubic term generator is electrically coupled to the RF input terminal. The analog cubic term generator is configured to receive the RF signal from the RF terminal and to generate an analog cubic term signal derived from the RF signal. An analog square term generator is electrically coupled to the RF input terminal. The analog square term generator is configured to receive the RF signal from the RF terminal and to generate an analog square term signal derived from the RF signal. A cubic term mixer assembly is electrically coupled to the analog cubic term generator. The cubic term mixer is configured to mix a local oscillator (LO) signal with the cubic term signal to generate a synthetic IM3 signal. At least one multiplier has a first multiplier input terminal a second multiplier input terminal, and a multiplier output terminal. The first multiplier input terminal is configured to receive a selected one of the analog square term signal and the synthetic IM3 signal. The second multiplier input terminal is configured to receive the square term signal. The multiplier is configured to provide as output an IMn product, where n is greater than 3.

In one embodiment, the polynomial nonlinear term generator further includes an RF signal conditioning circuit having an RF signal conditioning circuit input terminal coupled to the input RF terminal, and an RF signal conditioning circuit output terminal. The analog square term generator is electrically coupled to the input RF terminal through a selected one of the RF signal conditioning circuit input terminal and the RF signal conditioning circuit output terminal. The analog cubic term generator is electrically coupled to the input RF terminal through a selected one of the RF signal conditioning circuit input terminal and the RF signal conditioning circuit output terminal.

In another embodiment, the RF signal conditioning circuit is a low noise amplifier (LNA).

In yet another embodiment, the nonlinear term generator further includes a square term ADC that is electrically coupled to the analog square generator and is configured to provide as output a digital square term signal derived from the analog square term signal. A cubic term ADC is electrically coupled to the cubic term mixer and configured to provide as output a digital cubic term signal derived from the analog cubic term signal. The at least one multiplier includes a digital multiplier.

In yet another embodiment, the polynomial nonlinear term generator further includes a RF balun disposed between the RF input and the cubic term generator, wherein the cubic term generator is configured to receive a balanced RF signal.

In yet another embodiment, the cubic term mixer assembly includes an in phase (I) mixer and a quadrature (Q) mixer and the cubic term mixer assembly is configured to output a digital I cubic term signal and a digital Q cubic term signal.

In yet another embodiment, the digital cubic term signal includes a digital I cubic term signal and a digital Q cubic term signal.

In yet another embodiment, the polynomial nonlinear term generator is integrated on a single substrate.

In yet another embodiment, the polynomial nonlinear term generator includes circuitry disposed on two or more chips.

In yet another embodiment, the polynomial nonlinear term generator concludes at least one digital operation performed in a microprocessor-based computation device.

In yet another embodiment, a polynomial nonlinear term generator includes an input RF terminal that is configured to receive an RF signal. An analog cubic term generator is electrically coupled to the RF input terminal. The analog cubic term generator is configured to receive the RF signal from the RF terminal and to generate an analog cubic term signal derived from the RF signal. An analog square term generator is electrically coupled to the RF input terminal. The analog square term generator is configured to receive the RF signal from the RF terminal and to generate an analog square term signal derived from the RF signal. A cubic term mixer assembly is electrically coupled to the analog cubic term generator. The cubic term mixer is configured to mix a local oscillator (LO) signal with the cubic term signal to generate a synthetic IM3 signal. At least one multiplier has a first multiplier input terminal, a second multiplier input terminal, and a multiplier output terminal. The first multiplier input terminal is configured to receive a selected one of the square term signal and the synthetic IM3 signal. The second multiplier input terminal is configured to receive the square term signal, the multiplier is configured to provide as output an IMn product, where n is greater than 3. The polynomial nonlinear term generator exists in combination with a receiver RF input terminal electrically connected to the input RF terminal of the polynomial nonlinear term generator. A main path is electrically coupled to the receiver RF input terminal. The main path includes a main path mixer assembly is configured to mix an RF input signal with a local oscillator and to provide as output a main path baseband signal. The main path includes a main path ADC that is configured to digitize the main path baseband signal. An IM combining circuit has a plurality of input terminals. Each input terminal is configured to receive one of the plurality of IMn products generated by the polynomial nonlinear term generator. The IM combining circuit has an output terminal. The IM combining circuit is configured to combine the plurality of IMn products to provide as output an IM correction signal at the output terminal. A combining element is configured to receive the main path signal and to receive the IM correction signal and to combine the main path signal and the IM correction signal, and is configured to provide as output a signal having a plurality of nonlinear distortion signals that are substantially attenuated as compared to the main path signal.

In one embodiment, the polynomial nonlinear term generator further includes an RF signal conditioning circuit having an RF signal conditioning circuit input terminal coupled to the input RF terminal, and an RF signal conditioning circuit output terminal. The analog square term generator is electrically coupled to the input RF terminal through a selected one of the RF signal conditioning circuit input terminal and the RF signal conditioning circuit output terminal. The analog cubic term generator is electrically coupled to the input RF terminal through a selected one of the RF signal conditioning circuit input terminal and the RF signal conditioning circuit output terminal.

In another embodiment, the RF signal conditioning circuit is a low noise amplifier (LNA).

In yet another embodiment, the polynomial nonlinear term generator further includes a square term ADC electrically coupled to the analog square generator and which is configured to provide as output a digital square term signal derived from the analog square term signal. A cubic term ADC is electrically coupled to the cubic term mixer and configured to provide as output a digital cubic term signal derived from the analog cubic term signal. The at least one multiplier concludes a digital multiplier.

In yet another embodiment, the polynomial nonlinear term generator further includes at least one digital filter disposed between the at least one digital multiplier and the IM combining circuit.

In yet another embodiment, the at least one digital filter disposed between the at least one digital multiplier and the IM combining circuit includes a cascade of an IIR filter, an HPF filter and an RRC filter.

In yet another embodiment, the polynomial nonlinear term generator, further includes at least one adaptive filter disposed between the at least one digital multiplier and the IM combining circuit.

In yet another embodiment, the at least one adaptive filter disposed between the at least one digital multiplier and the IM combining circuit is further configured to have an I IMn input and a Q IMn input.

In yet another embodiment, the feedforward error-compensated receiver provides sufficient attenuation of the nonlinear distortion signals such that the feedforward error-compensated receiver can be operated in the absence of an external duplexer.

In yet another embodiment, the feedforward error-compensated receiver has a −100 dBm or lower input referred error.

In yet another embodiment, the polynomial nonlinear term generator is integrated on a single substrate.

In yet another embodiment, the single substrate includes a 90 nm RF CMOS technology.

In another aspect of the invention, a polynomial nonlinear term generator includes an input RF terminal that is configured to receive an RF signal. An analog cubic term generator is electrically coupled to the RF input terminal. The analog cubic term generator is configured to receive the RF signal from the RF terminal and to generate an analog cubic term signal derived from the RF signal. An analog square term generator is electrically coupled to the RF input terminal. The analog square term generator is configured to receive the RF signal from the RF terminal and to generate an analog square term signal derived from the RF signal. A cubic term mixer assembly is electrically coupled to the analog cubic term generator. The cubic term mixer is configured to mix a local oscillator (LO) signal with the cubic term signal to generate a synthetic IM3 signal. At least one multiplier has a first multiplier input terminal, a second multiplier input terminal, and a multiplier output terminal. The first multiplier input terminal is configured to receive a signal having a term of even order 2 m, where m is an integer equal to or greater than 1. The second multiplier input terminal is configured to receive the cubic term signal. The multiplier is configured to provide as output an IMn product, where n is greater than 4.

In one embodiment, the polynomial nonlinear term generator further includes an RF signal conditioning circuit having an RF signal conditioning circuit input terminal coupled to the input RF terminal, and an RF signal conditioning circuit output terminal. The analog square term generator is electrically coupled to the input RF terminal through a selected one of the RF signal conditioning circuit input terminal and the RF signal conditioning circuit output terminal. The analog cubic term generator is electrically coupled to the input RF terminal through a selected one of the RF signal conditioning circuit input terminal and the RF signal conditioning circuit output terminal.

In another embodiment, the RE signal conditioning circuit is a low noise amplifier (LNA).

In yet another embodiment, the polynomial nonlinear term generator further includes a square term ADC electrically coupled to the analog square generator and is configured to provide as output a digital square term signal derived from the analog square term signal. A cubic term ADC is electrically coupled to the cubic term mixer and configured to provide as output a digital cubic term signal derived from the analog cubic term signal. The at least one multiplier includes a digital multiplier.

In yet another aspect of the invention, a method for reducing IM products in a receiver includes the steps of providing a receiver including a polynomial nonlinear term generator based cancellation circuit including at least one digital multiplier; deriving a square term representation of IM2 products and a cubic term representation of IM3 products of an RF signal present at a RF input of the receiver; multiplying the cubic term signal with a selected one of the cubic term and the square term to generate at least one IMn term where n is greater than 3; combining the cubic term the square term and the at least one IMn term where n is greater than 3 to form a composite IM correction term; and combining the composite IM correction term with a baseband signal of a main path of the receiver to provide as output a signal having a plurality of nonlinear distortion signals that are substantially attenuated as compared to the main path signal.

In one embodiment, following the deriving step, there is performed the step of digitizing the square term signal to develop a digital representation of the square term and digitizing the cubit term signal to develop a digital cubic term representation of the cubic term; and wherein in the steps of multiplying and combining the signals that are multiplied and combined are digital signals.

In another embodiment, circuits of the receiver used for the method for reducing IM products in a receiver are inactive in the absence of a blocker signal.

In yet another embodiment, the receiver includes a RADAR receiver.

In yet another embodiment, the receiver includes a radio receiver.

In yet another embodiment, the radio receiver is a component of a medical device.

In yet another embodiment, the medical device is implanted in a human or an animal.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 6A is a diagram that illustrates schematically successive regeneration and adaptive feedforward cancellation of IM products at baseband that has been implemented in this work.

FIG. 6B is a diagram that shows a simplified system block diagram.

DETAILED DESCRIPTION

The description which follows is divided into two parts. Part I describes a split analog/digital polynomial nonlinear term generator with a reduced number of ADCs, employing successive regeneration and adaptive cancellation of intermodulation products which can be implemented using a nonlinear term generator as described in Part I.

Part I

A Split Analog/Digital Polynomial Nonlinear Term Generator with Reduced Number of Analog-To-Digital Converters Mixed-Mode Linearity Enhancement of RF Receivers In a paper titled "Advanced digital signal processing techniques for compensation of nonlinear distortion in wideband multicarrier radio receivers," published in IEEE Transactions on Microwave Theory and Techniques, volume 54, pages 2356-66, June 2006, Valkama, et. al., described a scheme to enhance the linearity of RF receivers in which nonlinear intermodulation products are generated at digital baseband from an incoming communication signal and then subtracted from the original signal via adaptive equalization. However, in RF (radio frequency) receivers, the dominant nonlinear intermodulation products are generated by signals relatively far out from the receiver LO (local oscillator) signal. Hence, these nonlinear intermodulation generating signals (otherwise known as blockers) are unavailable at digital baseband. The nonlinear intermodulation products are also in general unavailable at analog baseband due to inherent baseband low-pass filtering in RF receivers.

Figure 1:
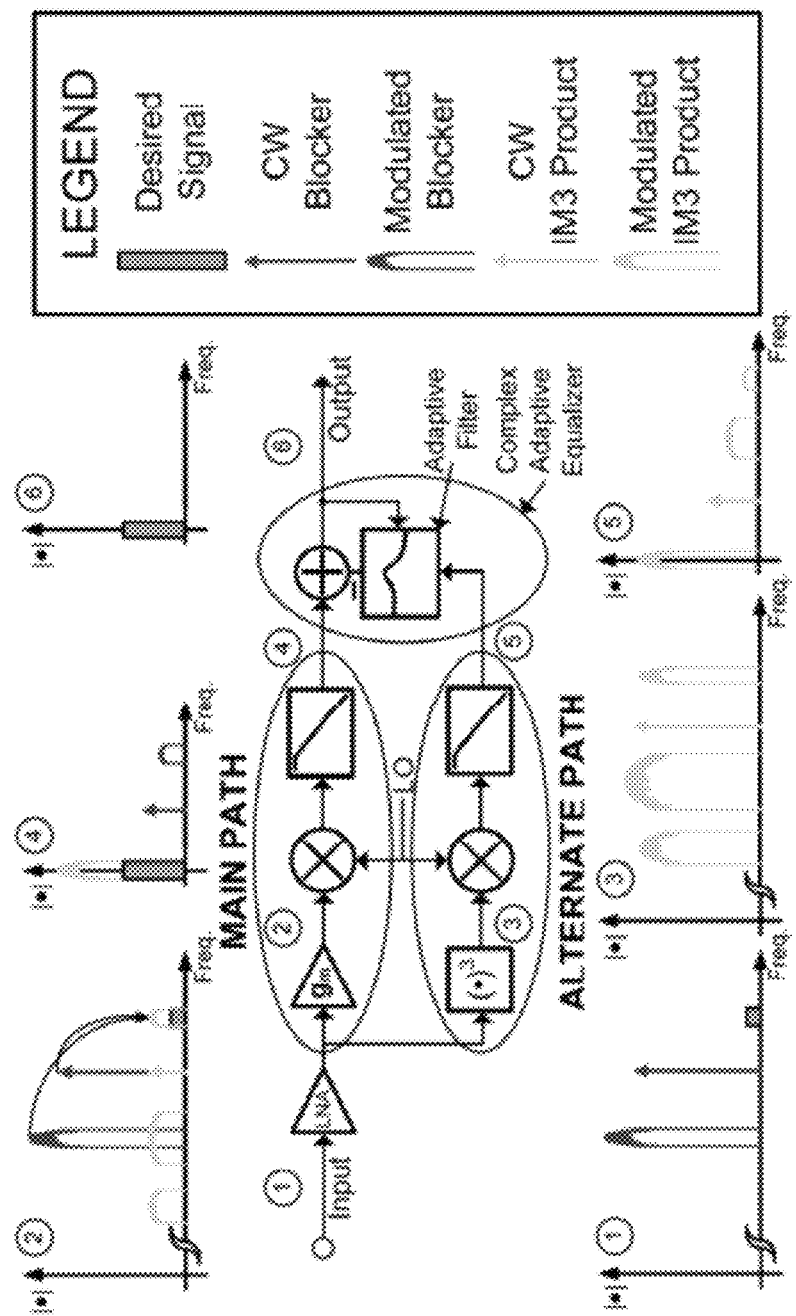
FIG. 1 illustrates the concept behind one exemplary RF receiver architecture in which IM3 products are generated at RF and adaptively equalized at digital baseband.

The present inventors have shown that a commercial-grade RF receiver can be effectively linearized by generating compensatory intermodulation products at analog RF both after and in parallel with nonlinear-product generating circuit blocks at RF and by equalizing the intermodulation products via adaptive filtering at digital baseband. See Equalization of Third-Order Intermodulation Products in Wideband Direct Conversion Receivers, IEEE Journal of Solid-State Circuits, Volume: 43, Issue: 12, pages 2853-2867, and Equalization of IM3 Products in Wideband Direct-Conversion Receivers, Solid-State Circuits Conference 2008, ISSCC 2008, pages 204-205, both by the present inventors, and U.S. patent application Ser. No. 12/233,314, Equalization of Third-Order Intermodulation Products in Wideband Direct Conversion Receiver, filed Sep. 18, 2008. The concept behind this architecture is depicted in FIG. 1, and one embodiment of the architecture is shown in FIG. 2.

Figure 2:
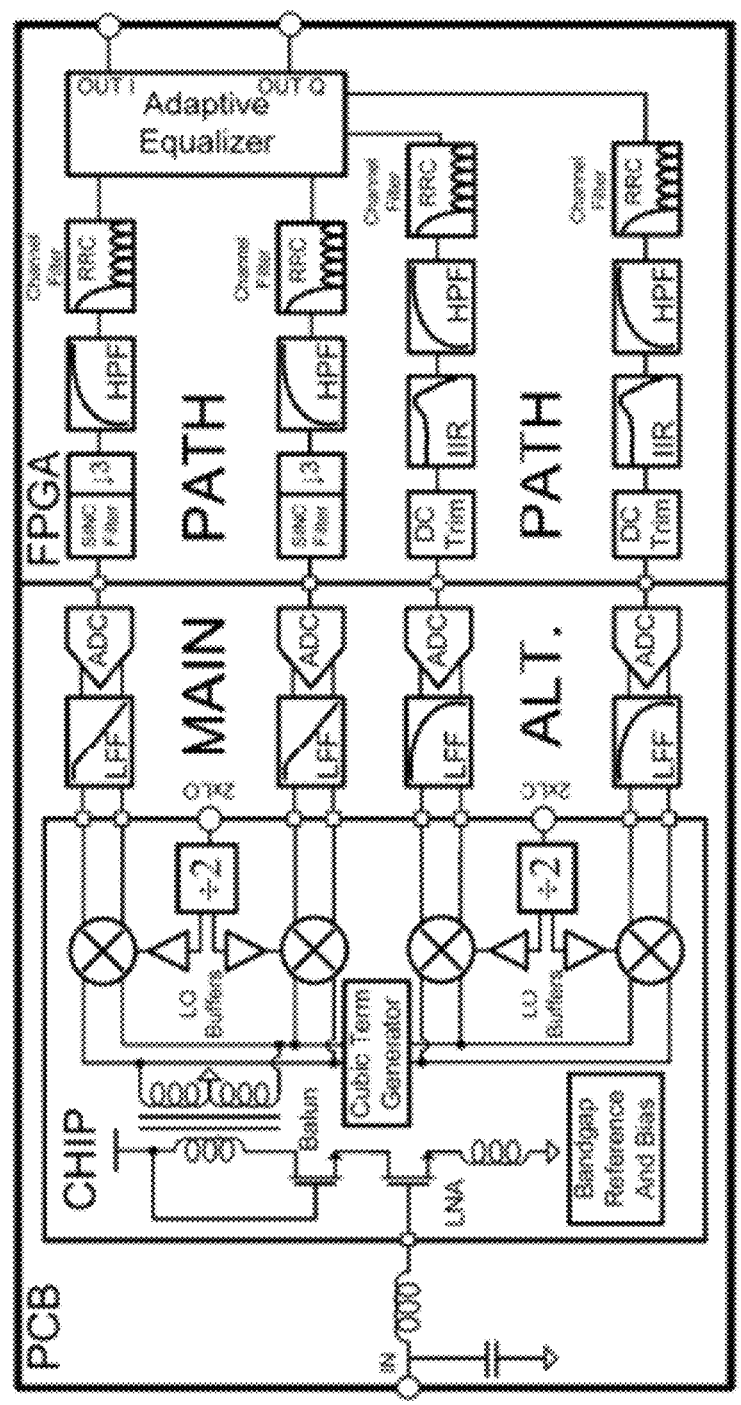
FIG. 2 shows a block diagram of one exemplary embodiment of a receiver architecture as implemented and evaluated.

However, the architecture of FIG. 2 uses an extra set of A/D converters to digitize the compensatory nonlinear intermodulation products. In this case, it was only desired that third-order intermodulation (IM3) products should be compensated, so only IM3 (third order intermodulation) products (I and Q) were digitized. However, even if the power consumption of the extra A/D converters is relatively small, the attractiveness of extending the scheme of FIG. 1 and FIG. 2 to receivers where multiple types of IM products are compensated for is limited because of the extra converters.

Duplexerless Universal Mobile Telecommunications System Communication

A longstanding goal of the RF design community is to incorporate a complete Universal Mobile Telecommunications System (UMTS) transceiver on a chip. In this single chip approach, the traditional off-chip duplexer, which separates the transmit (TX) and receive (RX) portions of the receiver, is eliminated. However, with elimination of the off-chip duplexer, the RX low-noise amplifier (LNA) can see a signal up to +28 dBm in magnitude from the TX in the presence of a −15 dBm blocker from the antenna in the presence of the desired signal. Assuming that on-chip transformer techniques can provide a moderate amount of isolation between the main and alternate paths (around 15 dB vs. 52 dB provided by off-chip duplexers) then the TX signal seen at the LNA is about +13 dBm.

We describe systems and methods to perform an effective linearization of the RF receiver under these conditions, but distortion products of both even and odd order up to IM7 products are expected to be useful in the equalization process. In some embodiments, IM products up to IM13, or higher can be cancelled. It is advantageous to perform this equalization of the IM products with a minimal number of analog-to-digital converters.

Mixed Analog/Digital IM Product Generation

The systems and methods described hereinbelow exploit the fact that the predominant condition under which higher-order nonlinear IM products should be compensated for involves the large TX leakage blocker. In this case, all dominant higher-order nonlinear term products contain $(TX)^2$ terms. Under other blocking conditions, only IM2 and IM3 products would have to be adaptively compensated. In this case, however, not only will the two IM3 digitizing ADCs from FIG. 1 and FIG. 2 be present, but a single IM2 digitizing ADC should be present to digitize baseband IM2 products generated from out-of-band blockers at RF. I and Q IM2 ADCs are not required, as phase information is lost in the second-order nonlinear transfer function. We have recognized that if these three ADCs exist (digitizing baseband IM2 and baseband I and Q IM3 products) and if the TX blocker is much greater in magnitude than all other possible blockers involved in the production of IM products, than all of the information required to compensate for higher-order nonlinear terms is already present at digital baseband.

To our knowledge, this is the first time that an RF receiver has been subject to such large blocker signals at its input while needing to maintain about a −100 dBm total input-referred error.

Solution Architecture

Figure 3:
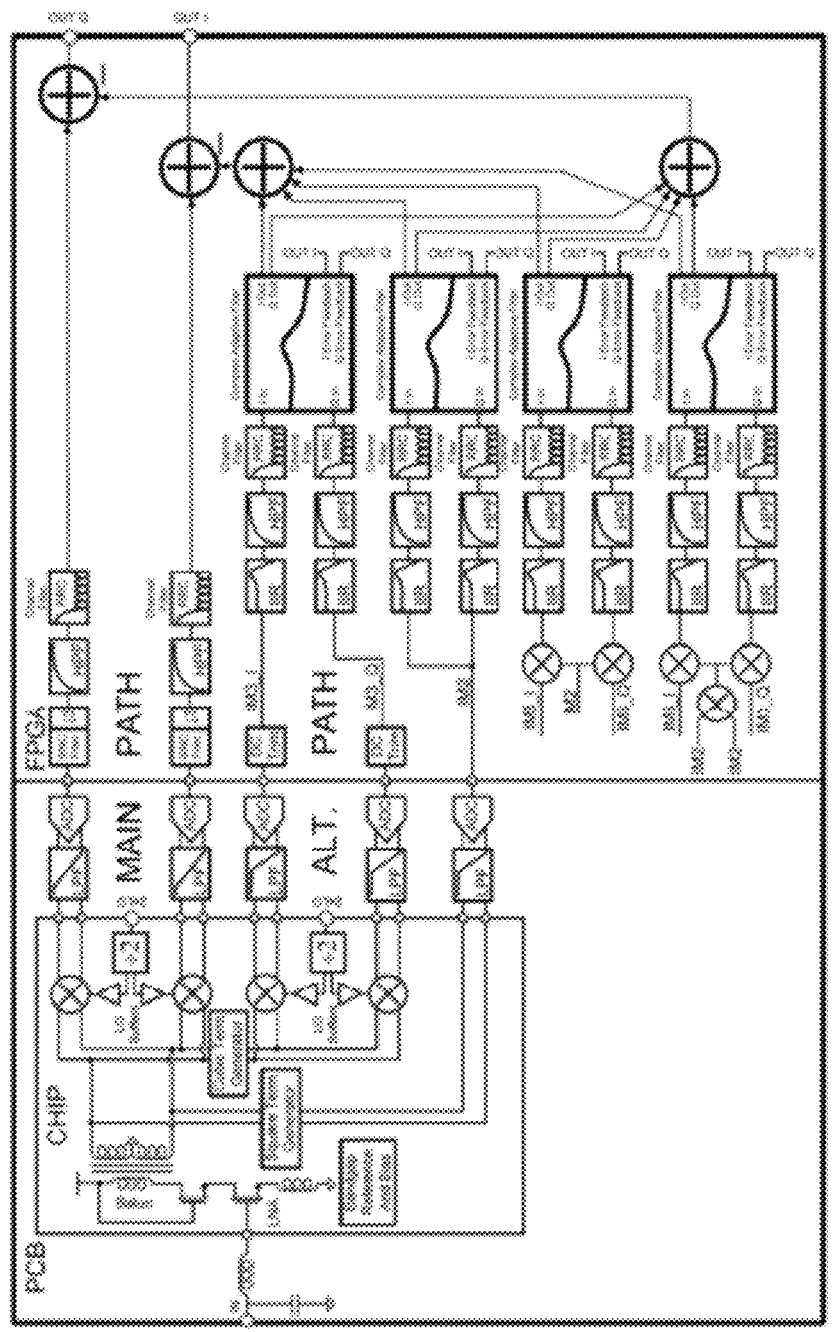
FIG. 3 shows a block diagram of one exemplary receiver architecture according to principles of the invention.

One solution to this problem, a split analog/digital polynomial nonlinear term generator with reduced number of analog-to-digital converters, is shown in the block diagram of FIG. 3. The IM2 and IM3 terms are generated at RF analog in an alternate receiver path (as shown in FIG. 1 and in FIG. 2), and as described in more detail herein below, higher order terms are generated in the digital domain.

We assume that substantially all of the nonlinear effects in the main receiver path occur at RF. That is, such nonlinear effects are assumed to occur prior to the application of circuitry (e.g. the baseband circuitry) which is strongly dependent on frequency deviation from the desired signal center frequency. Therefore, any composite baseband filtering applied prior to the application of further nonlinearity should have a passband which causes negligible group delay and amplitude distortion. Accordingly, the baseband filter cutoff frequency of the alternate path filter is set well away from the edge of the desired reference IM2 and IM3 signals.

These higher order terms are generated by multiplying the I and Q IM3 products with even order IM products. The even order IM products are generated by successively multiplying the IM2 products to generate IM4, IM6, etc. products. After this generation has taken place, digital models of the receiver main path baseband circuitry are applied to the alternate path IM products in order to better match the IM products in the main path. LMS (least mean square) based adaptive filtering is then applied to each IM product in order to fine-tune the match so that adequate cancellation can be achieved. It is believed that this technique does not work in general for two blocker signals having about the same magnitude.

Simulation Results

Figure 4:
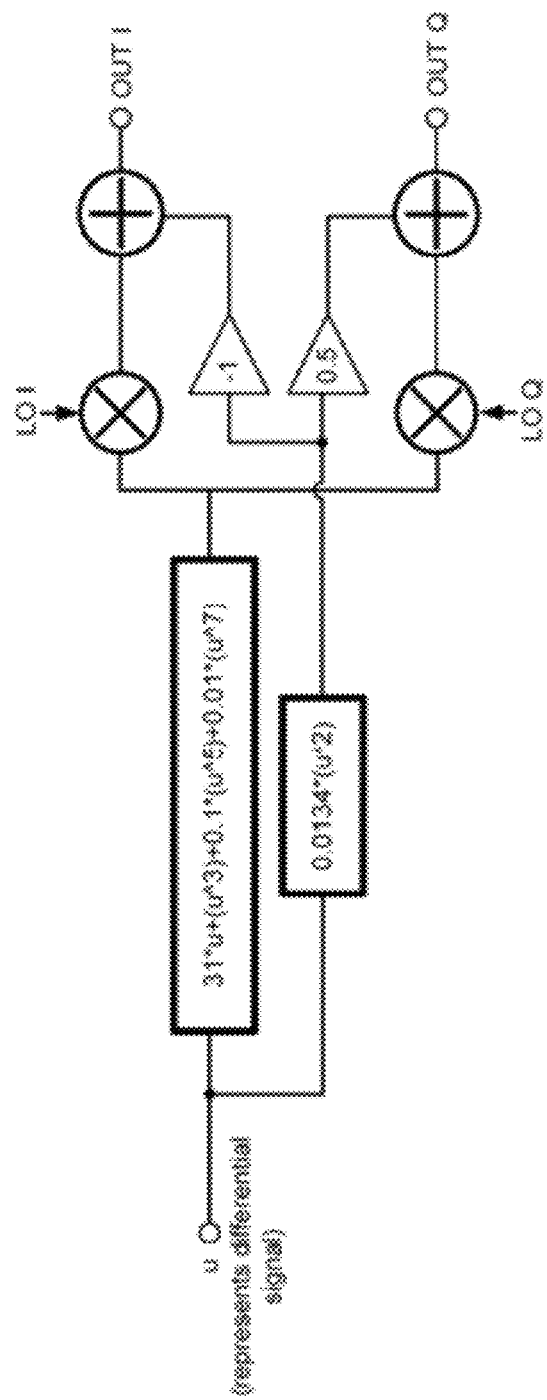
FIG. 4 shows an illustration of a main path RF nonlinearity model used for simulations.

The system architecture was simulated in MATLAB® Simulink® (available from Math Works® of Natick, Mass.), with a simulation block diagram of the main path RF model shown in FIG. 4. The two blockers in the system are a TX leakage signal and a CW blocker, as per the UMTS specification. The TX signal is modeled by a QPSK waveform at a carrier frequency of 0.95 GHz and an input referred magnitude of approximately 13.5 dBm. The CW signal is modeled by a sinusoid at a carrier frequency of 0.9 GHz and an input referred magnitude of approximately −15 dBm, the LO frequency is set to 1 GHz.

The correction ratio (RMS-averaged over I and Q channels) for the resultant total set of IM products is shown below under the following conditions:

| | |
|---|---|
| IM3 LMS Loop Only Active: | 21.53 dB |
| IM2 + IM3 LMS Loops Only Active: | 31.77 dB |
| IM2 + IM3 + IM5 LMS Loops Only Active: | 41.42 dB |
| IM2 + IM3 + IM5 + IM7 LMS Loops Active: | 41.46 dB |

Figure 5A:
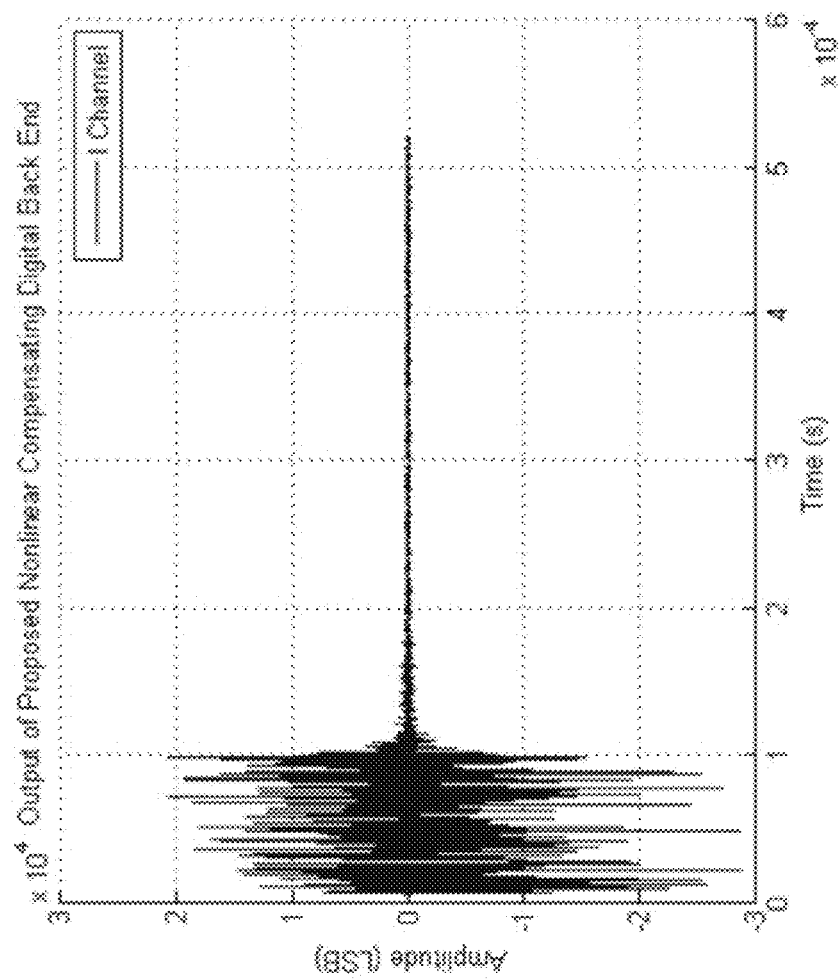
FIG. 5A shows a simulation result for the I channel of a Simulink® model of the system, where all correction loops are active.
Figure 5B:
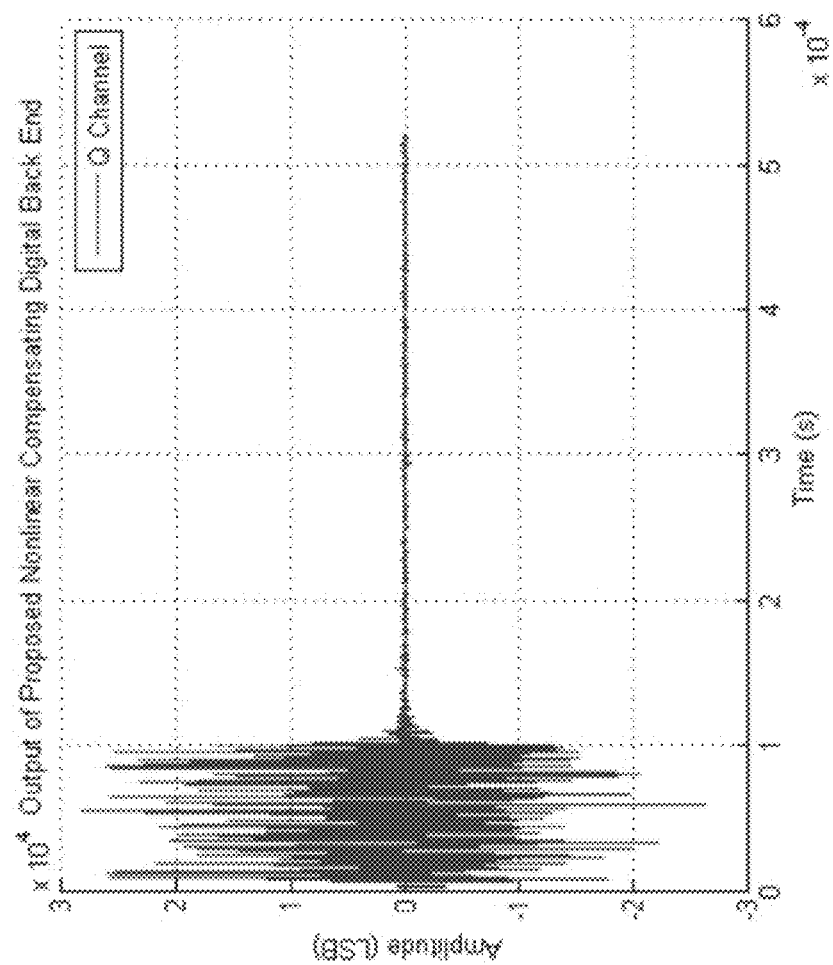
FIG. 5B shows another simulation result for the Q channel of a Simulink® model of the system, where all correction loops are active.

FIG. 5A shows simulation results for the I channel of a Simulink® Model of the system, where all correction loops are active. FIG. 5B shows another simulation result for the Q channel of a Simulink® Model of the system, where all correction loops are active.

Part II

A Receiver Employing Successive Regeneration and Adaptive Cancellation of Intermodulation Products We now describe one exemplary rail-to-rail input receiver employing successive regeneration and adaptive cancellation of intermodulation products. The receiver overcomes the limitations of the prior art and can operate successfully in the large-signal regime. The receiver as described in more detail hereinbelow can handle the presence of many higher-order intermodulation (IM) products generated from a large input signal.

Theory of Operation

The theory of operation by which the receiver accomplishes this is an extension of that presented in U.S. Ser. No. 12/233,314 as cited hereinabove, in which the dominant IM products are regenerated at RF in an alternate nonlinear receiver path, then downconverted, digitized, and finally used to cancel IM products in the nominally linear (main) receiver path via adaptive filtering. FIG. 6A is a diagram that illustrates schematically successive regeneration and adaptive feedforward cancellation of IM products at baseband that has been implemented in this work. FIG. 6B shows a simplified block diagram and illustrates concepts of a receiver according to principles of the invention. The receiver has two nonlinear receiver paths, one each for even and odd order IM products. Once downconverted and digitized, the even and odd order IM products can be successively multiplied in the digital domain to regenerate higher order IM products.

For example, as illustrated in FIG. 6A, IM2 products can be squared to generate an approximation to IM4 products. IM2 and IM3 products can be multiplied to generate an approximation to IM5 products. This approximation approaches an equality when one of the blocker signals is much larger than all of the rest. To see this, consider as in FIG. 6A a scenario with two blocker signals with complex envelopes $a(t)=a_I(t)+ja_Q(t)$ and $b(t)=b_I(t)+jb_Q(t)$. Dropping the (t) for brevity, the baseband nonlinear terms can be derived as:

$$IM2 \propto a_I^2 + a_Q^2 + b_I^2 + b_Q^2 \qquad (1)$$

$$IM3_I \propto a_I^2 b_I + 2a_I a_Q b_Q - a_Q^2 b_I \qquad (2)$$

$$IM3_Q \propto -a_I^2 b_Q + 2a_I a_Q b_I + a_Q^2 b_Q \qquad (3)$$

The IM4 and IM5 terms in the linear path are:

$$IM4 \propto IM2^2 + 2(a_I^2 + a_Q^2)(b_I^2 + b_Q^2) \qquad 4)$$

$$IM5_I \propto IM3_I((a_I^2 + a_Q^2) + 3/2(b_I^2 + b_Q^2)) \qquad (5)$$

$$IM5_Q \propto IM3_Q((a_I^2 + a_Q^2 +) + 3/2(b_I^2 + b_Q^2 +)) \qquad (6)$$

while the IM4 and IM5 reference terms are:

$$IM4_{REF} \propto IM2^2 \qquad (7)$$

$$IM5_{I,REF} \propto IM3_I IM2 \qquad (8)$$

$$IM5_{Q,REF} \propto IM3_Q IM2 \qquad (9)$$

It can be seen that as $|a(t)|/|b(t)| \to \infty$, the reference terms approach the corruptive terms in the linear path and at this point large cancellation ratios can be achieved.

Although the receiver only achieves large cancellation ratios for large $|a(t)|/|b(t)|$, it is important to note that this condition is precisely the same as that of many important nonlinear blocking problems. For example, in FDD communications systems with relaxed PA/LNA isolation, the TX leakage appears as the dominant blocker to the receiver. For example, implantable medical sensors that receive power wirelessly may also need to demodulate a small data signal in the presence of a dominant power transfer signal. In addition, radar systems can benefit from being able to handle a single very large intentional jamming signal.

RE/Analog Receiver Architecture and Circuits
Linear Path Receiver Architecture

Figure 7:
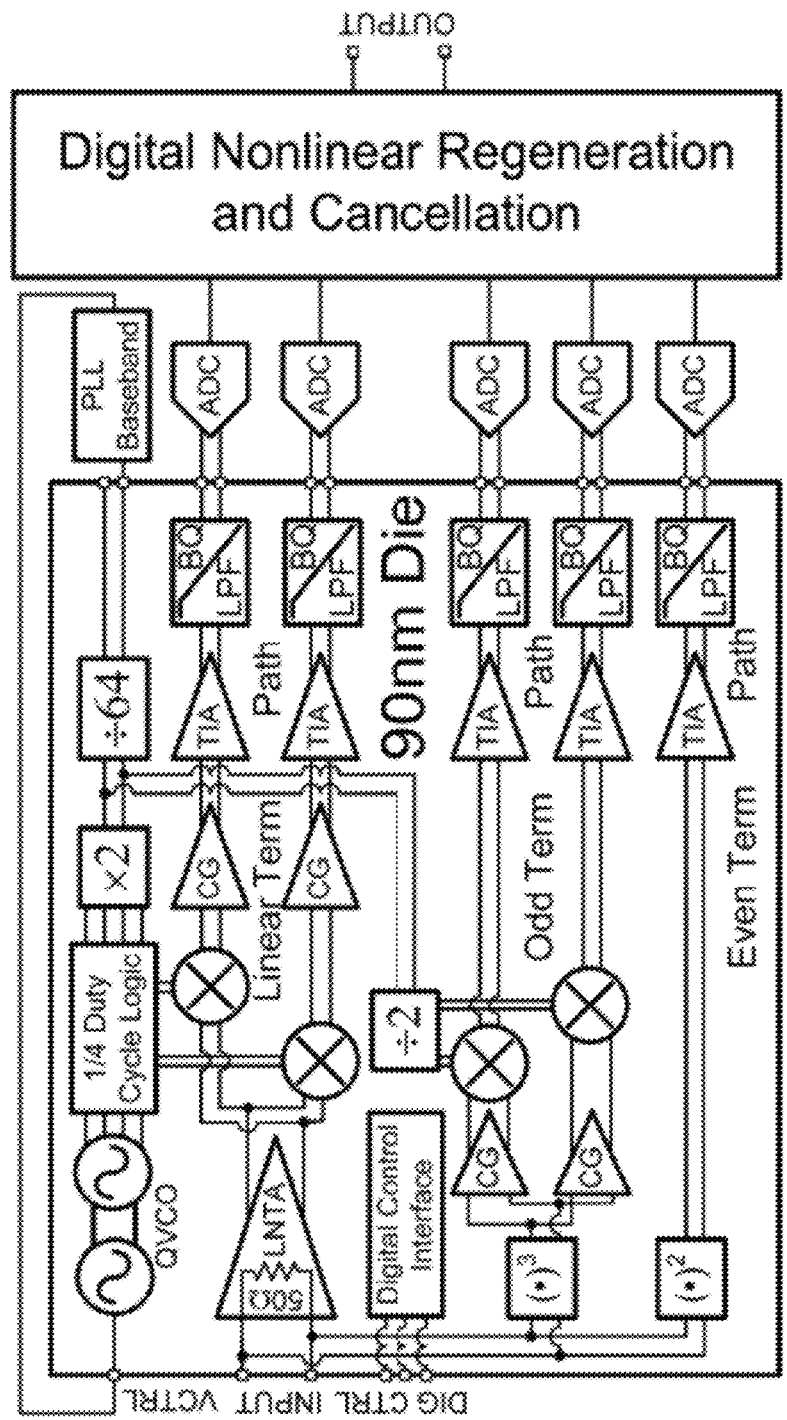
FIG. 7 shows an illustration of one exemplary receiver architecture according to principles of the invention.

FIG. 7 shows the architecture of the complete receiver and block diagram of the RF front end. In order to maximize the large-signal handling capability of the receiver, the input signal is immediately converted into current by a low-noise transconductance amplifier (LNTA). This current is then directly converted by a set of quadrature passive mixers to baseband, where it is filtered by relatively large capacitors. In order to isolate the I and Q down conversion chains with minimal voltage swing at the LNTA output, a ¼-phase passive mixer scheme was used.

The noise generated by the transimpedance amplifier (TIA) in a passive mixer system is a well-known problem in cases such as this when the impedance looking back up into the passive mixer is low. In order to provide a high input impedance to the TIA, it is preceded by a common-gate (CG) buffer, thereby lowering its effective noise contribution. A 2nd-order active RC biquad (BQ) was used to both buffer the TIA and to complete a 3rd-order Chebychev low-pass anti-aliasing filter. One such suitable passive mixer buffer was described in U.S. Patent Provisional Application Ser. No. 61/181,247, A Common-Gate Buffer for Passive-Mixer Based Direct Conversion Receivers, filed May 26, 2009, which application is incorporated herein by reference in its entirety for all purposes.

The VCO runs at the LO frequency in order to minimize the out-of-band phase noise floor for a given power dissipation. This is an atypical choice due to the fact that it promotes LO-RF and RF-LO coupling, increasing DC offset and decreasing IIP2, respectively. However, in this architecture DC offset is compensated by adding a differential static current to the first OTA virtual ground in the BQ. Therefore, IM2 products are ultimately cancelled using the scheme as described hereinabove. One such suitable VCO was described in U.S. Provisional Patent Application Ser. No. 61R 81,237, A Low-Phase Noise VCO for Cellular Receivers filed May 26, 2009, which application is incorporated herein by reference in its entirety for all purposes.

Linear Receiver Blocks

Figures 8A, 8B:
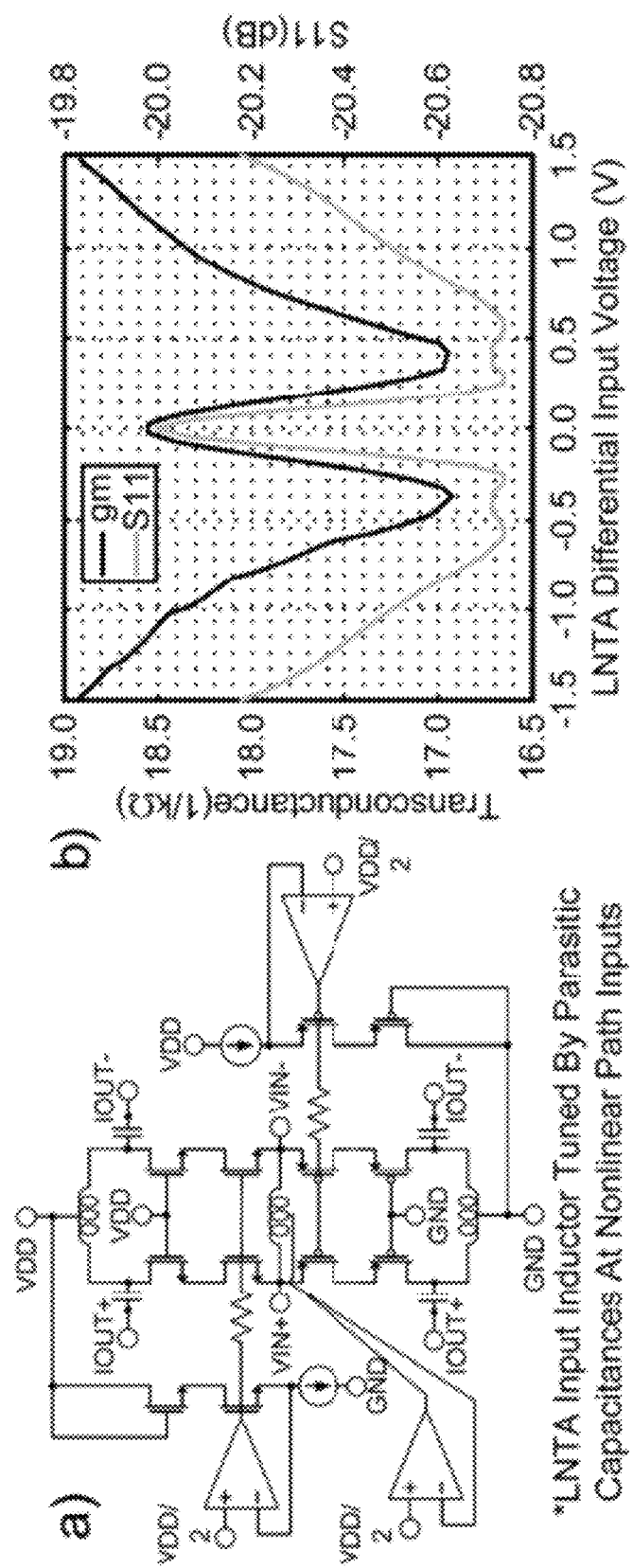
FIG. 8A shows a schematic diagram of a simplified LNTA.
FIG. 8B shows exemplary static LNTA simulations with differential $g_m$ and S11 as a function of differential input voltage.

A differential rail-to-rail input receiver accommodates a signal at its input whose amplitude is nearly equal to the supply voltage before reaching ICP1. To accomplish this, a push-pull CG-LNTA is introduced in FIG. 8A. The transconductance (and hence input impedance) remains relatively constant over a rail-to-rail input, as shown in FIG. 8B, substantially guaranteeing that the absolute magnitude of odd-order IM products generated for large signals also remains roughly constant. However, because this nonlinear transconductance is non-monotonic, it generates many high-order IM products which should also be canceled. One such LNA, suitable for rail-to-rail operation, was described in U.S. Provisional Patent Application Ser. No. 61/181,243, A Wide-Swing LNA for High-Linearity Receivers, filed May 26, 2009, which application is incorporated herein by reference in its entirety for all purposes.

Figures 9A, 9B:
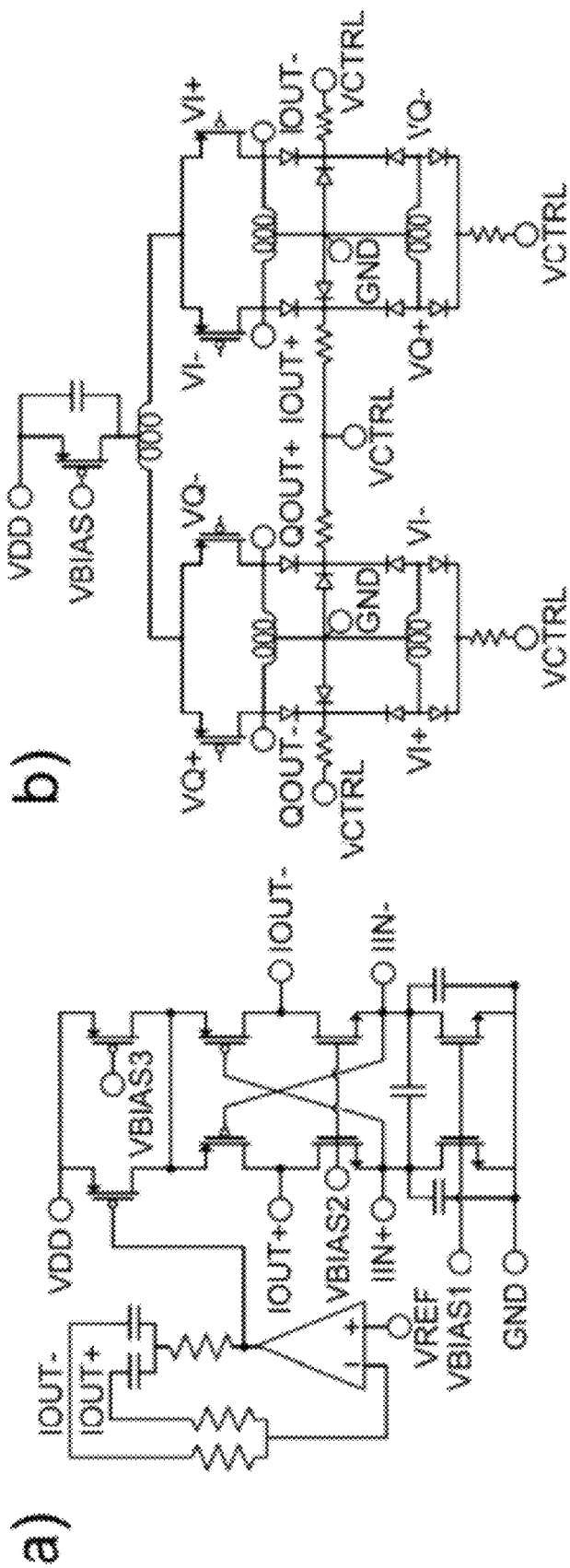
FIG. 9A shows a schematic diagram of a TIA CMOS common gate buffer.
FIG. 9B shows a schematic diagram of a VCO.

In order to approximately double the current gain of the CG buffer preceding the TIA, the receiver utilizes a cross-coupled CMOS architecture, shown in FIG. 9A, in which the CG-device current is re-used in a pair of PMOS common-source amplifiers. Reciprocal mixing noise due to the very large blocker and VCO phase noise is addressed via the use of the Q-doubling dual-LC tank 90° phase-shift QVCO shown in FIG. 9B. The dual tanks provide additional filtering of out-of-band phase noise.

RF Signal Conditioning Circuit

Figure 6C:
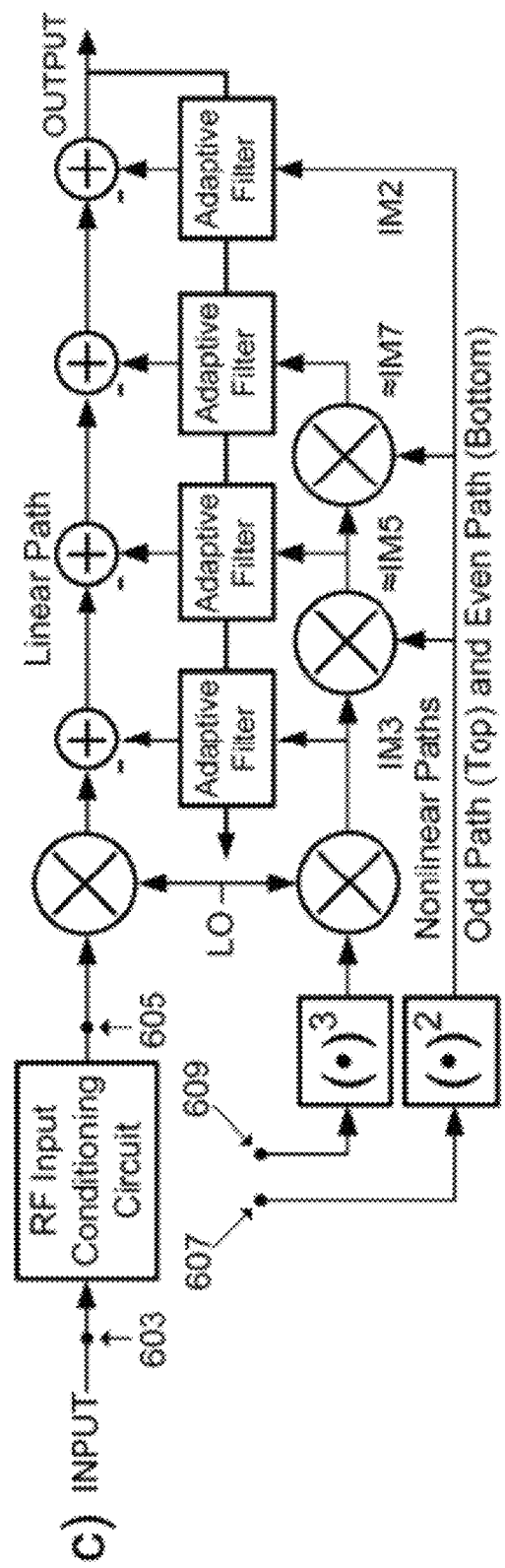
FIG. 6C shows the simplified system block diagram of FIG. 6B further including a RF signal conditioning block.

FIG. 6C shows the simplified system block diagram of FIG. 6B further including a RF signal conditioning block (or RF input conditioning circuit). The input terminal of the RF signal conditioning block is typically connected to an RF input terminal. An output terminal of the RF signal conditioning block is typically connected to downstream RF blocks, such as for example, to the main path of a RF receiver. An RF signal conditioning circuit input node 603 (RF signal conditioning block input terminal) is connected to the RF input conditioning circuit input. An RF signal conditioning circuit output node 605 (RF signal conditioning block output terminal) is connected to the conditioning circuit output. In such embodiments, the square term input node 607 and the cubic term input node 609 can be alternatively electrically coupled to an RF input directly, such via the RF signal conditioning circuit input node 603, or indirectly, such as via the conditioning circuit output node 605, and therefore electrically coupled to the RF input through the RF signal conditioning block. Accordingly, square term input node 607 can be connected to either of conditioning circuit input node 603 or conditioning circuit output node 605, and the cubic term input node 609 can be connected to either of conditioning circuit input node 603 or conditioning circuit output node 605. The RF signal conditioning block can include a LNA, such as a LNTA, a mixer, a filter, and/or passive or active components, such as one or more resistors, capacitors, inductors, or transistors.

Nonlinear Path Receiver Architecture and Circuits

Figure 10:
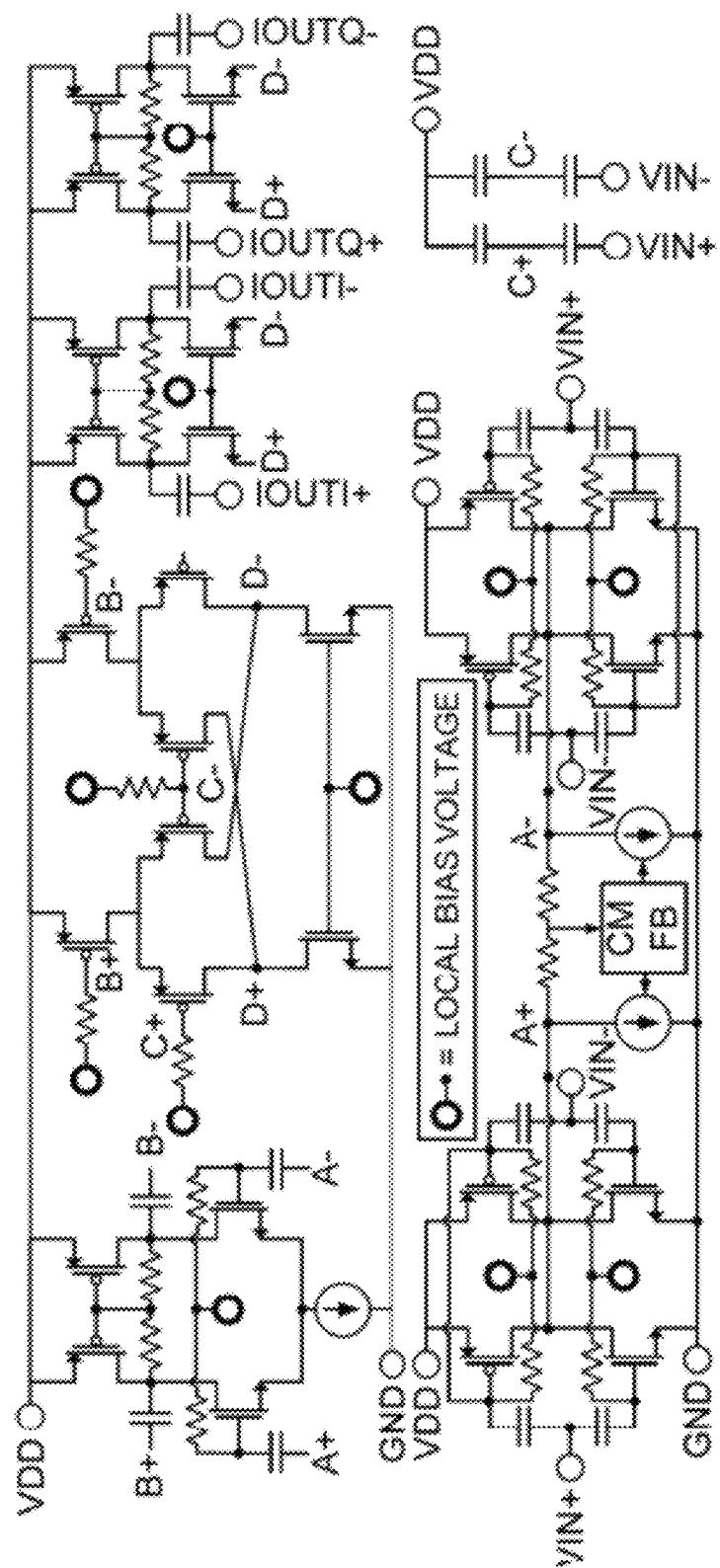
FIG. 10 shows a schematic diagram of an exemplary odd path IM generator with CG butlers.

In contrast to the architecture presented in U.S. Ser. No. 12/233,314 as cited hereinabove, the nonlinear path inputs are now derived directly from the receiver input, as this is the only point in the receiver at which some version of the RF input is commonly available as a voltage of appreciable magnitude. The odd path IM term generator, shown in FIG. 10, utilizes a multistage architecture also as was described in Equalization of Third-Order Intermodulation Products in Wideband Direct Conversion Receivers, but with a CMOS input stage in order to increase the dynamic range. The even path IM term generator comprises a buffered canonical squaring circuit that feeds directly into a TIA. The dynamic ranges of the two nonlinear paths are set high enough so as to not be a limiting factor in cancellation.

Because LTI (linear time-invariant) filtering and multiplication are not commutative, it is important to keep the system effectively memoryless prior to the nonlinear term regeneration. For this reason, low-ripple baseband filters with minimal in-band group delay distortion are used to buffer the nonlinear path outputs.

In a manner similar to the description of one exemplary embodiment which follows, there can also be embodiments of both Polynomial Nonlinear Term Generators and associated IMn product cancelling receivers that multiply a square and or cubic term to generate IMn terms of third order or higher order using an analog circuit.

Digital Back End

Figure 11:
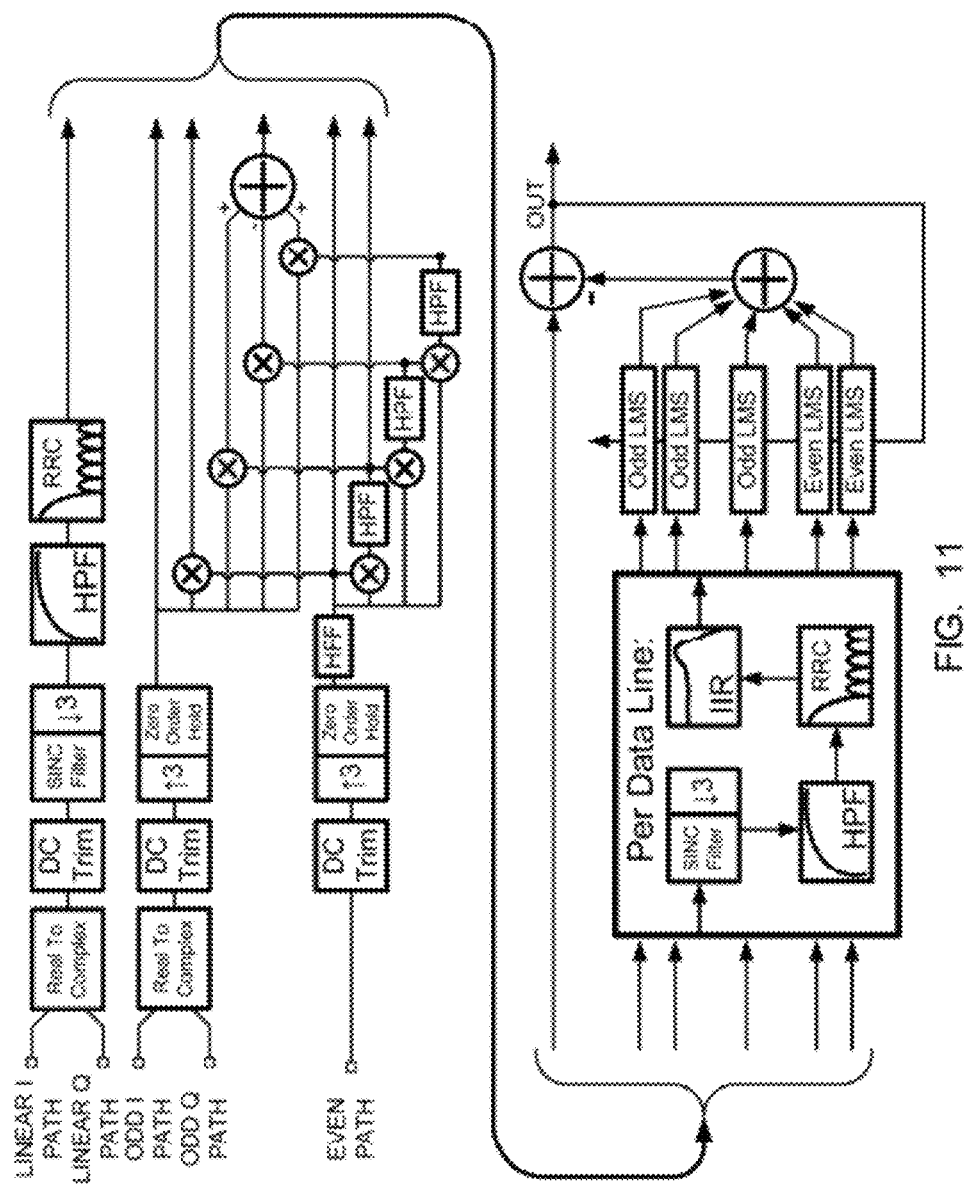
FIG. 11 shows an illustration of one exemplary digital back end architecture.

The analog outputs of the exemplary receiver are captured by 12 bit discrete ADCs running at 50 MHz and 16.66 MHz for the linear and nonlinear paths, respectively. For this proof-of-concept demonstration, the digital back end (DBE) is implemented in a 16-bit fixed-point software model, with its architecture shown in FIG. 11. The nonlinear path inputs are upsampled and filtered prior to successive nonlinear reference generation to ensure that unwanted higher-order nonlinear terms do not alias into the signal band. After this process is complete, an approximate model of the linear path baseband filter removes undesired residues from these operations and helps to better match the linear and nonlinear paths.

The remaining difference between the linear and nonlinear path transfer functions is fine-tuned via LMS adaptive equalizers modified to compensate for I/Q mismatch. As higher-order nonlinear terms are generated by the sine-like nonlinearity as shown in FIG. 8B, the higher order terms are grouped together into a single output in which the signs of the nonlinear terms alternate. This grouping prevents the composite signal from having a large peak-to-average ratio, which can disrupt the convergence of the algorithm. The complete nonlinear path circuitry uses 11 16-bit multipliers running at 50 MHz and 204 16-bit multipliers running at 16.66 MHz. Assuming that the multipliers dominate the power consumption, the extra digital circuitry for the nonlinear paths and adaptive filters would consume about 28 mA under a 1.3 V supply. It is believed that the power consumption can be dramatically reduced by time-averaging, as correction is only required under blocking conditions.

Measurement Results

Figures 12A, 12B:
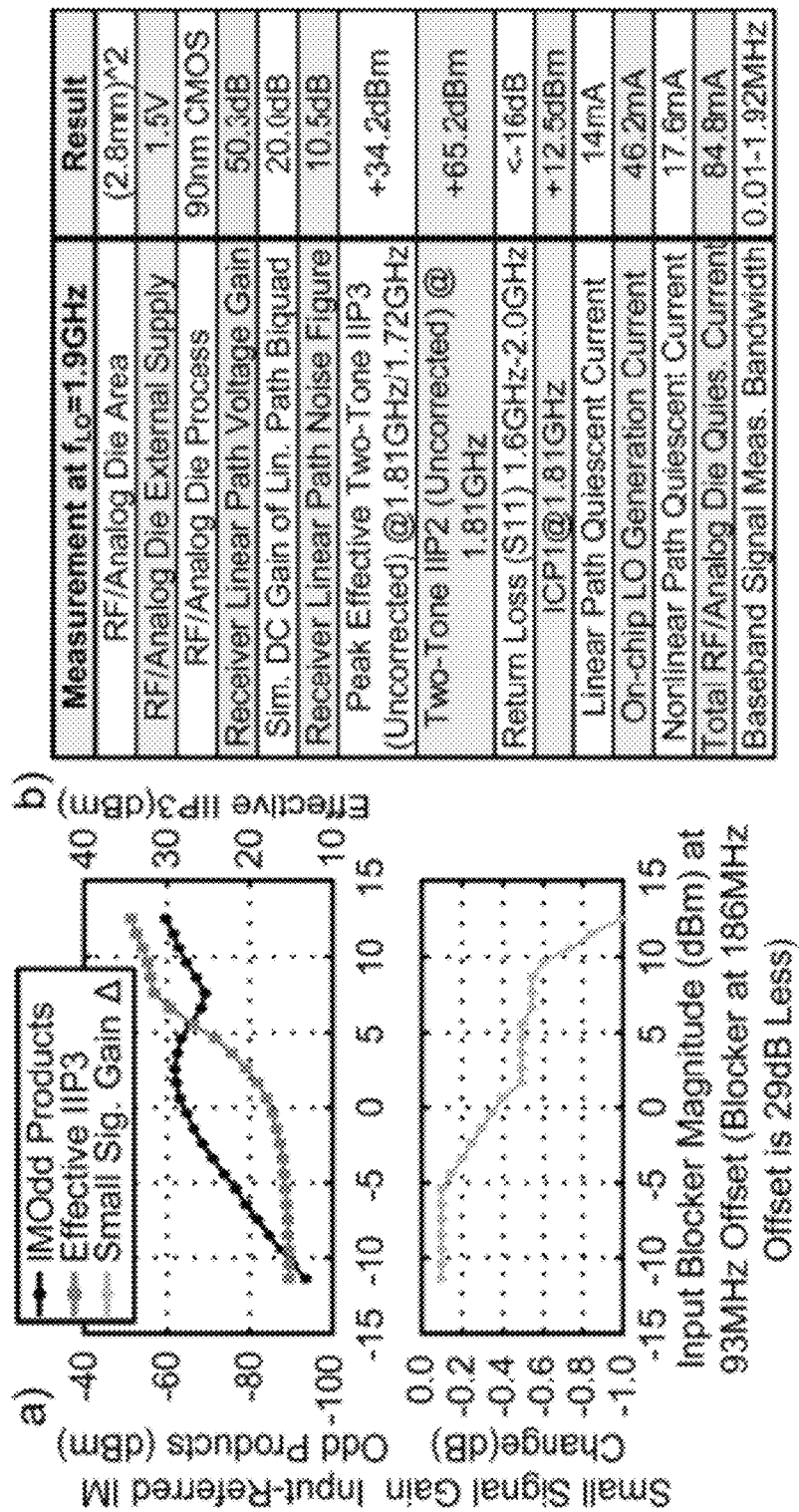
FIG. 12A shows the results of a two-CW tone IIP3 test, including measured input referred error, effective IIP3, and ICP1 of a standalone RF/analog die.
FIG. 12B shows a table of one set of exemplary baseline receiver performance metrics.

The non-monotonic nature of the LNTA nonlinearity is apparent in the results of the two-tone measurement shown in FIG. 12A. In this case, a large CW blocker at 93 MHz LO frequency offset is swept with a smaller blocker at 186 MHz offset while the LO is set to run at 1.9 GHz. Although the small signal gain of the receiver is negligibly reduced, the magnitude of the IM products at the output remains roughly constant. By extrapolating at each point of the sweep, an effective IIP3 metric can be obtained, reaching a peak of +34.2 dBm for a rail-to-rail blocker at the input.

The blocking and linearity performance of the receiver is also tested under UMTS blocking conditions by applying a +12.6 dBm QPSK modulated signal at 3.84 MSPS along with a −16.6 dBm CW blocker. When the adaptive nonlinear correction is enabled, the input-referred error drops by 17.1 dB. The convergence time of the adaptive equalization in this case is about 30 μs.

Figures 13A, 13B:
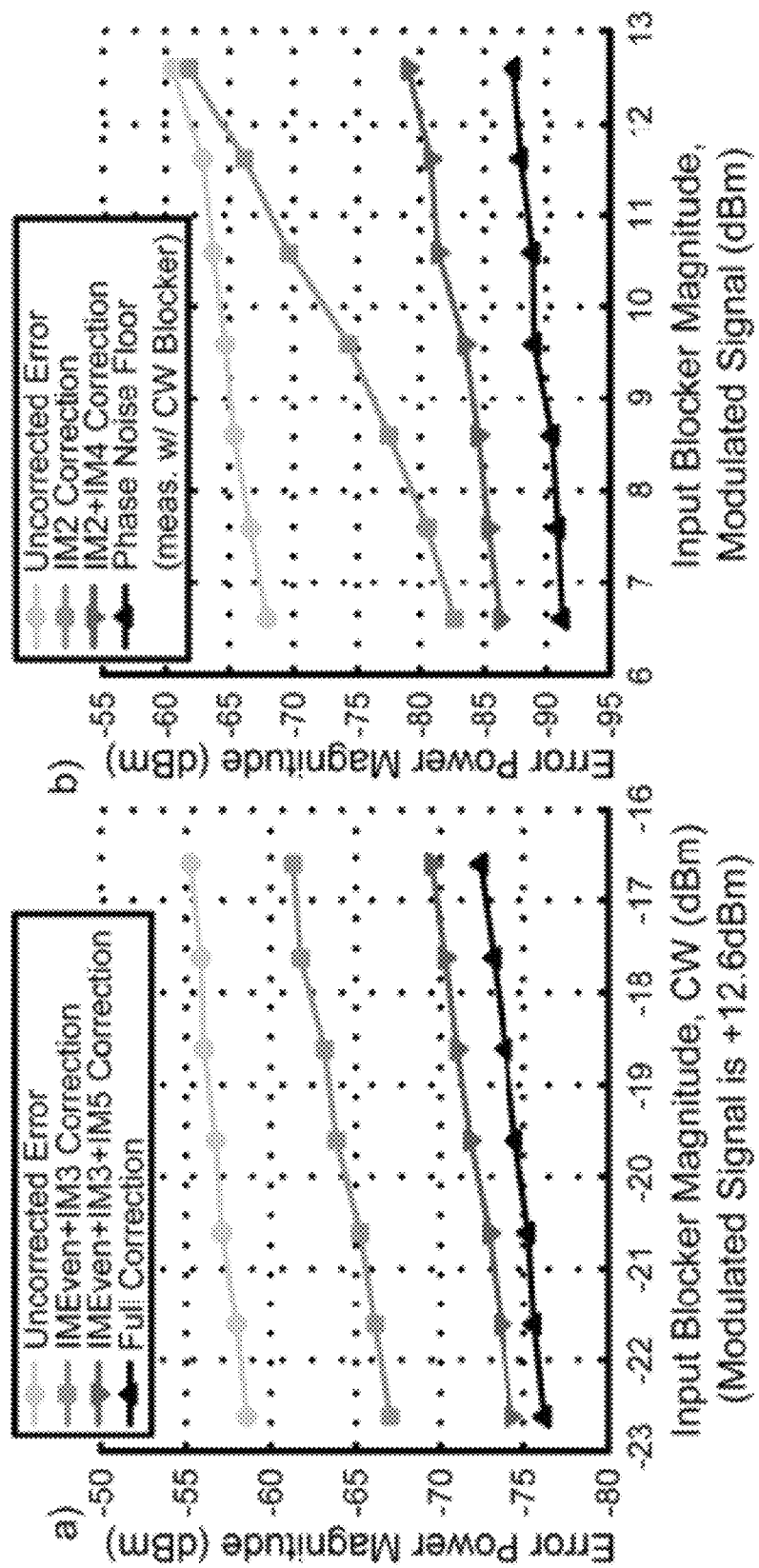
FIG. 13A shows an illustration of a measured input-referred error with even and odd order cancellation for two-signal blocking.
FIG. 13B shows even order cancellation for large QPSK-modulated blocker and phase noise floor measured with a CW blocker.
Figure 14:
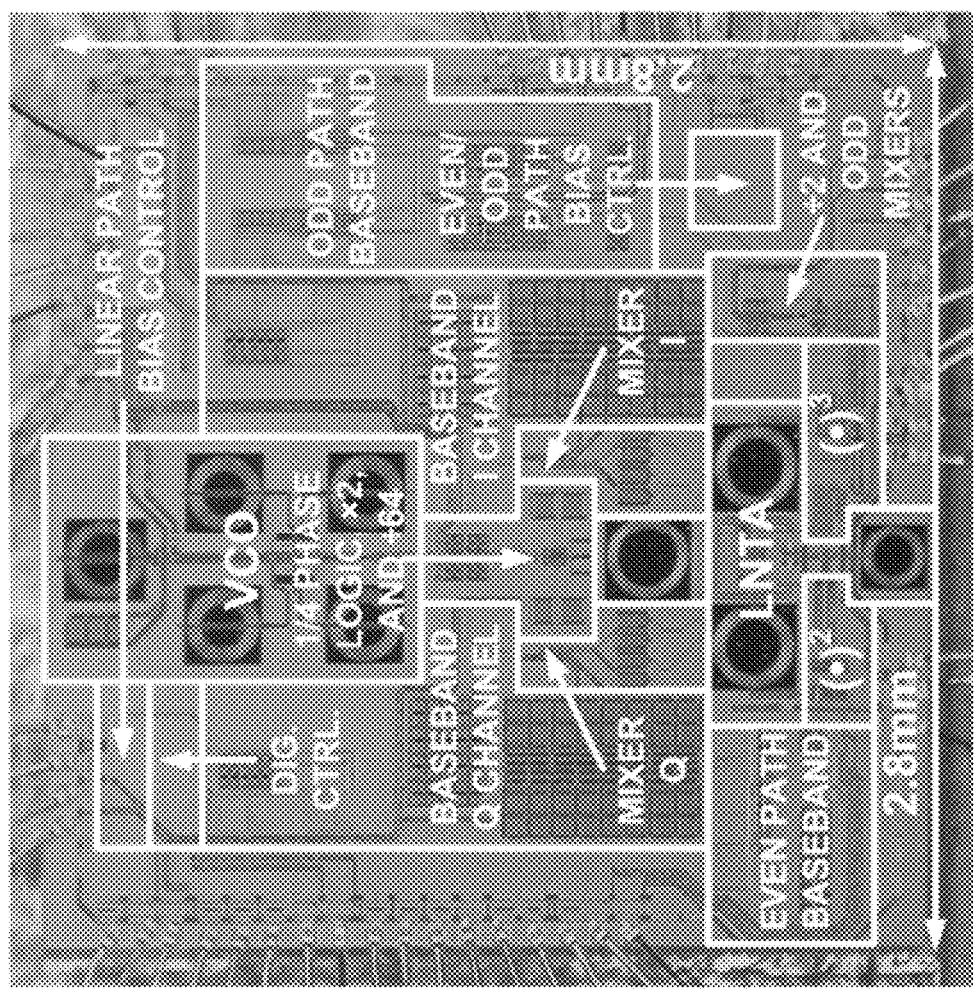
FIG. 14 shows a photo of one exemplary RF/analog chip that has been implemented.

For the case in which no CW blocker is present and only even-order correction is enabled, the input-referred error drops by 18.5 dB. The performance summary of the baseline receiver is shown in FIG. 12B. The measured cancellation performance across several input magnitudes and different levels of correction applied is shown in FIG. 13. One exemplary RF/analog die is shown in FIG. 14. The chip is fully ESD protected and is controlled by a digital interface.

A large-signal handling direct conversion receiver has been demonstrated in a 90 nm RE CMOS technology. The receiver achieves an out-of-band ICP1 of +12.6 dBm and a peak uncorrected IIP3 of +34.2 dBm. Adaptive feedforward cancellation of modulated IM products yields nearly an order of magnitude improvement in input-referred error.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A polynomial nonlinear term generator comprising:
  an input RF terminal configured to receive an RF signal;
  an analog cubic term generator electrically coupled to said RF input terminal, said analog cubic term generator configured to receive said RF signal from said RF terminal and to generate an analog cubic term signal derived from said RF
  an analog square term generator electrically coupled to said RF input terminal, said analog square term generator configured to receive said RF signal from said RF terminal and to generate an analog square term signal derived from said RF signal;
  a cubic term mixer assembly electrically coupled to said analog cubic term generator, said cubic term mixer configured to mix a local oscillator (LO) signal with said cubic term signal to generate a synthetic IM3 signal; and
  at least one multiplier having a first multiplier input terminal, a second multiplier input terminal, and a multiplier output terminal, said first multiplier input terminal configured to receive a selected one of said analog square term signal and said synthetic IM3 signal, said second multiplier input terminal configured to receive said square term signal, said multiplier configured to provide as output an IMn product, where n is greater than 3.

2. The polynomial nonlinear term generator of claim 1, further comprising:
- an RF signal conditioning circuit having an RF signal conditioning circuit input terminal coupled to said input RF terminal, and an RF signal conditioning circuit output terminal;
- said analog square term generator is electrically coupled to said input RF terminal through a selected one of said RF signal conditioning circuit input terminal and said RF signal conditioning circuit output terminal; and
- said analog cubic term generator is electrically coupled to said input RF terminal through a selected one of said RF signal conditioning circuit input terminal and said RF signal conditioning circuit output terminal.

3. The polynomial nonlinear term generator of claim 2, wherein said RF signal conditioning circuit is a low noise amplifier (LNA).

4. The polynomial nonlinear term generator of claim 1, further comprising:
- a square term ADC electrically coupled to said analog square generator and configured to provide as output a digital square term signal derived from said analog square term signal;
- a cubic term ADC electrically coupled to said cubic term mixer and configured to provide as output a digital cubic term signal derived from said analog cubic term signal; and
- wherein said at least one multiplier comprises a digital multiplier.

5. The polynomial nonlinear term generator of claim 1, further comprising a RF balun disposed between said RF input and said cubic term generator, wherein said cubic term generator is configured to receive a balanced RF signal.

6. The polynomial nonlinear term generator of claim 1, wherein said cubic term mixer assembly comprises an in phase (I) mixer and a quadrature (Q) mixer and said cubic term mixer assembly is configured to output a digital I cubic term signal and a digital Q cubic term signal.

7. The polynomial nonlinear term generator of claim 6, wherein said digital cubic term signal comprises a digital I cubic term signal and a digital Q cubic term signal.

8. The polynomial nonlinear term generator of claim 1, wherein said polynomial nonlinear term generator is integrated on a single substrate.

9. The polynomial nonlinear term generator of claim 1, wherein said polynomial nonlinear term generator comprises circuitry disposed on two or more chips.

10. The polynomial nonlinear term generator of claim 1, wherein said polynomial nonlinear term generator comprises at least one digital operation performed in a microprocessor-based computation device.

11. A polynomial nonlinear term generator of claim 1, comprising:
- an input RF terminal configured to receive an RF signal;
- an analog cubic term generator electrically coupled to said RF input terminal, said analog cubic term generator configured to receive said RF signal from said RF terminal and to generate an analog cubic term signal derived from said RF signal;
- an analog square term generator electrically coupled to said RE input terminal, said analog square term generator configured to receive said RF signal from said RF terminal and to generate an analog square term signal derived from said RF signal;
- a cubic term mixer assembly electrically coupled to said analog cubic term generator, said cubic term mixer configured to mix a local oscillator (LO) signal with said cubic term signal to generate a synthetic IM3 signal; and
- at least one multiplier having a first multiplier input terminal, a second multiplier input terminal, and a multiplier output terminal, said first multiplier input terminal configured to receive a selected one of said square term signal and said synthetic IM3 signal, said second multiplier input terminal configured to receive said square term signal, said multiplier configured to provide as output an IMn product, where n is greater than 3;

in combination with:
- a receiver RF input terminal electrically connected to the input RF terminal of the polynomial nonlinear term generator;
- a main path electrically coupled to said receiver RF input terminal, said main path including a main path mixer assembly configured to mix an RF input signal with a local oscillator and to provide as output a main path baseband signal, and said main path including a main path ADC configured to digitize said main path baseband signal;
- an IM combining circuit having a plurality of input terminals, each input terminal configured to receive one of said plurality of IMn products generated by said polynomial nonlinear term generator, said IM combining circuit having an output terminal, said IM combining circuit configured to combine said plurality of IMn products to provide as output an IM correction signal at said output terminal; and
- a combining element configured to receive said main path signal and to receive said IM correction signal and to combine said main path signal and said IM correction signal, and configured to provide as output a signal having a plurality of nonlinear distortion signals that are substantially attenuated as compared to said main path signal.

12. The polynomial nonlinear term generator of claim 11, further comprising:
- an RF signal conditioning circuit having an RF signal conditioning circuit input terminal coupled to said input RF terminal, and an RF signal conditioning circuit output terminal;
- said analog square term generator is electrically coupled to said input RF terminal through a selected one of said RF signal conditioning circuit input terminal and said RF signal conditioning circuit output terminal; and
- said analog cubic term generator is electrically coupled to said input RF terminal through a selected one of said RF signal conditioning circuit input terminal and said RF signal conditioning circuit output terminal.

13. The polynomial nonlinear term generator of claim 12, wherein said RF signal conditioning circuit is a low noise amplifier (LNA).

14. The polynomial nonlinear term generator of claim 11, further comprising:
- a square term ADC electrically coupled to said analog square generator and configured to provide as output a digital square term signal derived from said analog square term signal;
- a cubic term ADC electrically coupled to said cubic term mixer and configured to provide as output a digital cubic term signal derived from said analog cubic term signal; and
- wherein said at least one multiplier comprises a digital multiplier.

15. The polynomial nonlinear term generator of claim 14, further comprising at least one digital filter disposed between said at least one digital multiplier and said IM combining circuit.

16. The polynomial nonlinear term generator of claim 15, wherein said at least one digital filter disposed between said at least one digital multiplier and said IM combining circuit comprises a cascade of an IIR filter, an HPF filter and an RRC filter.

17. The polynomial nonlinear term generator of claim 14, further comprising at least one adaptive filter disposed between said at least one digital multiplier and said IM combining circuit.

18. The polynomial nonlinear term generator of claim 14, wherein said at least one adaptive filter disposed between said at least one digital multiplier and said IM combining circuit is further configured to have an I IMn input and a Q IMn input.

19. The polynomial nonlinear term generator of claim 11, wherein said feedforward error-compensated receiver provides sufficient attenuation of said nonlinear distortion signals such that said feedforward error-compensated receiver can be operated in the absence of an external duplexer.

20. The polynomial nonlinear term generator of claim 11, wherein said feedforward error-compensated receiver has a −100 dBm or lower input referred error.

21. The polynomial nonlinear term generator of claim 11, wherein said polynomial nonlinear term generator is integrated on a single substrate.

22. The polynomial nonlinear term generator of claim 21, wherein said single substrate comprises a 90 nm RF CMOS technology.

23. A polynomial nonlinear term generator comprising:
an input RF terminal configured to receive an RF signal;
an analog cubic term generator electrically coupled to said RF input terminal, said analog cubic term generator configured to receive said RF signal from said RF terminal and to generate an analog cubic term signal derived from said RF signal;
an analog square term generator electrically coupled to said RF input terminal; said analog square term generator configured to receive said RF signal from said RF terminal and to generate an analog square term signal derived from said RF signal;
a cubic term mixer assembly electrically coupled to said analog cubic term generator, said cubic term mixer configured to mix a local oscillator (LO) signal with said cubic term signal to generate a synthetic IM3 signal; and
at least one multiplier having a first multiplier input terminal, a second multiplier input terminal, and a multiplier output terminal, said first multiplier input terminal configured to receive a signal having a term of even order $2^m$, where m is an integer equal to or greater than 1, said second multiplier input terminal configured to receive said cubic term signal, said multiplier configured to provide as output an IMn product, where n is greater than 4.

24. The polynomial nonlinear term generator of claim 23, further comprising:
an RF signal conditioning circuit having an RF signal conditioning circuit input terminal coupled to said input RF terminal, and an RF signal conditioning circuit output terminal;
said analog square term generator is electrically coupled to said input RF terminal through a selected one of said RF signal conditioning circuit input terminal and said RF signal conditioning circuit output terminal; and
said analog cubic term generator is electrically coupled to said input RF terminal through a selected one of said RF signal conditioning circuit input terminal and said RF signal conditioning circuit output terminal.

25. The polynomial nonlinear term generator of claim 24, wherein said RF signal conditioning circuit is a low noise amplifier (LNA).

26. The polynomial nonlinear term generator of claim 23, further comprising:
a square term ADC electrically coupled to said analog square generator and configured to provide as output a digital square term signal derived from said analog square term signal;
a cubic term ADC electrically coupled to said cubic term mixer and configured to provide as output a digital cubic term signal derived from said analog cubic term signal; and
wherein said at least one multiplier comprises a digital multiplier.

27. A method for reducing IM products in a receiver comprising the steps of:
providing a receiver comprising a polynomial nonlinear term generator based cancellation circuit including at least one digital multiplier;
deriving a square term representation of IM2 products and a cubic term representation of IM3 products of an RE signal present at a RF input of said receiver; multiplying said cubic term signal with a selected one of said cubic term and said square term to generate at least one IMn term where n is greater than 3;
combining said cubic term said square term and said at least one IMn term where n is greater than 3 to form a composite IM correction term; and
combining said composite IM correction term with a baseband signal of a main path of said receiver to provide as output a signal having a plurality of nonlinear distortion signals that are substantially attenuated as compared to said main path signal.

28. The method for reducing IM products in a receiver of claim 27, wherein following said deriving step there is performed the step of digitizing said square term signal to develop a digital representation of said square term and digitizing said cubit term signal to develop a digital cubic term representation of said cubic term; and wherein in the steps of multiplying and combining the signals that are multiplied and combined are digital signals.

29. The method of claim 27, wherein circuits of said receiver used for said method for reducing IM products in a receiver are inactive in the absence of a blocker signal.

30. The method of claim 27, wherein said receiver comprises a RADAR receiver.

31. The method of claim 27, wherein said receiver comprises a radio receiver.

32. The method of claim 27, wherein said radio receiver is a component of a medical device.

33. The method of claim 32, wherein said medical device is implanted in a human or an animal.

* * * * *